Patented Nov. 5, 1929

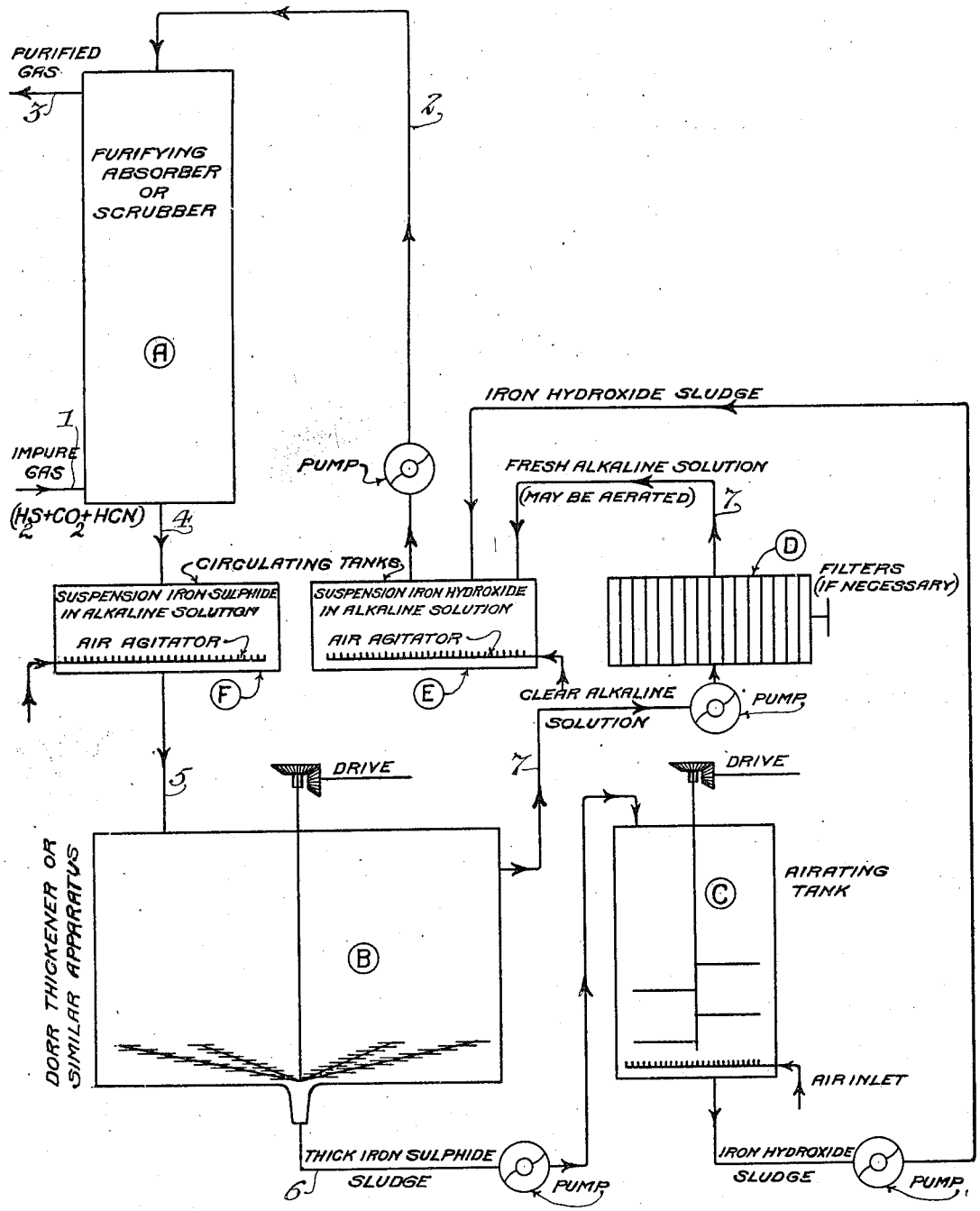

1,734,307

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

GAS-PURIFICATION PROCESS

Application filed December 8, 1921. Serial No. 520,807.

This invention relates to the removal of hydrogen sulphide and other noxious compounds, such as hydrocyanic acid, from gases containing them. Objects of the invention are to effect an efficient purification of such gases by means of an absorbent agent which removes the noxious constituents, combined with revivification of the absorbent agent in a manner that effects the ultimate formation of free sulphur, which may be removed from the absorbent agent by ordinary separation methods, thereby avoiding the escape of the noxious hydrogen sulphide fumes into the atmosphere in the vicinity of the gas purifying plant.

In addition to the general objects recited above, the invention has for further objects such other improvements in operation and results as are found to obtain in the processes hereinafter described or claimed.

In the accompanying drawing, forming a part of this specification and showing for purposes of exemplification a preferred form and manner in which the invention may be embodied and practiced, but without limiting the claimed invention specifically to such illustrative instance or instances:

The figure illustrates a diagrammatic representation of apparatus for carrying out the improved gas purification process of the present invention.

In its present embodiment, the invention is applied to the purification of fuel gases, such as coke oven gas from which the tar and ammonia have been removed, for convenience, the present description will be confined to the above mentioned important application of the invention. Features of the invention are, however, readily susceptible of other valuable application; consequently, the invention is not confined in its scope to the specific use and embodiment herein described as an illustrative example.

In carrying out the invention, the gases containing the impurities are passed through a gas line 1 into the bottom of a scrubber or washer A, which is supplied with the purifying agent or solution through a solution line 2 that enters the top of the scrubber.

In the scrubber A, the gases are brought into contact with the absorbent solution which is constituted of dissolved alkali, such as sodium carbonate or other alkaline substances, and containing in suspension an iron compound, such as iron oxide, having an affinity for sulphur. The concentration of the iron oxide in suspension and of the dissolved alkali may be varied as desired; in practice, a one-half to one percent sodium carbonate solution, with two to three percent iron oxide suspended in it, will be found satisfactory. The dissolved alkali absorbs the hydrogen sulphide and other noxious constituents of the gas forming soluble sulphide compounds; and then a second action takes place between the iron oxide and soluble alkali-metal sulphide compounds with the result that iron sulphide forms and the soluble alkali is regenerated. In effect, the soluble alkali of the solution acts as a carrier of the hydrogen sulphide to the iron oxide, whereby the iron oxide is converted to iron sulphide. Some of the iron oxide may also react directly with the hydrogen sulphide. The purified gases pass out of the top of the scrubber A through a gas line 3. From the bottom of the scrubber A, the solution containing the impurities discharges through a line 4 to a sump or tank F and then through a line 5 to a continuous separator B, such as a Dorr thickener. By the action of the separator B the bulk of the iron sulphide is agglomerated as a heavy sludge and may be drawn off from the bottom of the separator separately from the alkaline solution. The iron sulphide sludge is pumped through a sludge line 6 into a vessel C in which the iron sulphide is subjected to aeration, whereby it is converted to iron hydroxide and free sulphur. During the aeration, the sludge may be stirred by means such as the centrifugal stirrers shown. The alkaline solution is discharged from the separator B through the solution line 7 and may be subjected to the action of a filter press D, to remove any residual sludge, if necessary, and also may be aerated. The iron oxide from the aerating treatment (containing the free sulphur) is transferred by a line 8 and the fresh alkaline solution by the line 7 to the circulating tank or sump E, where oxide and solution are again mixed to form the suspension. In the tank E the solution containing the iron oxide suspension may be agitated, for example by air, or other means. The solution containing the suspension of iron oxide is thus regenerated and is now ready to treat further quantities of impure gas. The whole process may be operated continuously as shown in the attached diagram of apparatus. For this purpose, the revivified solution is again pumped to the scrubber A through the line 2.

The solutions are preferably stored in circulating tanks or sumps E and F as shown and air agitators or other means of agitation are provided in the respective tanks. The conversion of the iron sulphide to iron oxide and free sulphur, and other action of the air, may take place partly or even to a large extent in these tanks.

The thick iron sulphide sludge from the Dorr thickener or separator B, may be filter pressed and washed before aerating, when these steps in the process are desired.

In the gas purification step the chemical reactions may be exemplified by the following equations:

(a) Absorption of hydrogen sulphide by sodium carbonate:

$$Na_2CO_3 + H_2S = NaHS + NaHCO_3$$

Carbon dioxide, if present, is also absorbed:

$$Na_2CO_3 + H_2O + CO_2 = 2NaHCO_3$$

(b) Action of sodium hydrogen sulphide and sodium bicarbonate on the iron oxide forming iron sulphide:

$$Fe_2O_3 + 3NaHS + 3NaHCO_3 = Fe_2O_3 + 3Na_2CO_3 + 3H_2O$$

(c) Direct absorption of hydrogen sulphide by iron oxide:

$$Fe_2O_3 + 3H_2S = Fe_2S_3 + 3H_2O$$

During the aeration of the iron sulphide sludge, the chemical reaction may be exemplified by the following:

$$2Fe_2S_3 + 3O_2 = 2Fe_2O_3 + 6S$$

Aeration of the solution will also convert some sodium bicarbonate to sodium carbonate as follows:

$$2NaHCO_3 = Na_2CO_3 + CO_2 + H_2O$$

In addition to these reactions, some of the soluble sulphide, such as sodium hydrogen sulphide, reacts with the free sulphur present and air, resulting in the formation of sodium thiosulphate. In the present process, the iron sulphide sludge and solution are aerated separately, and the rate of thiosulphate formation is much slower than when the sludge and solution are aerated simultaneously. The sodium thiosulphate may be allowed to accumulate in the solution and can then be recovered by a suitable process, such as that described in the co-pending application for Letters Patent of the United States of Ralph E. Hall and David L. Jacobson, filed April 18, 1921, Serial No. 462,136. The rate of thiosulphate formation may be decreased by employing very dilute solutions, such as a solution containing one-half percent sodium carbonate or less. A further advantage in using such weakly alkaline solutions, is that the mechanical loss of dissolved alkali is thereby decreased and the process made more economical.

The free sulphur may be allowed to accumulate in the suspension, part of the sludge being withdrawn at suitable times for recovery of the sulphur and iron oxide. From time to time, fresh iron oxide may be added; or else iron sulphide may be added at a point before the air treatment which will convert it to iron oxide. The concentration of dissolved alkali may also be maintained by periodical additions.

The suspension will also remove hydrocyanic acid from the gas; this may go into chemical combination with the iron compounds, or else may pass out to some extent with the air used in the aerating processes.

The purification process is carried out as mentioned in the above exemplification by means of a suspension of iron oxide in an alkaline solution. This washing mixture may be obtained by means of a number of materials which have essentially the same effect in carrying out the reactions described. Instead of iron oxide, ferric carbonate or basic ferric carbonate may be employed; or the iron may be either in the form of ferric hydroxide or ferric oxide. Ferrous compounds, may also be used instead of the iron oxide either in the form of ferrous oxide, ferrous carbonate or basic carbonate or ferrous hydroxide. The ferrous compounds will have an action similar to the ferric oxide, and at the same time, the aerating process will gradually transform them to the ferric state. The dissolved alkali may be any substance which gives an alkaline reaction to the solution, such as the carbonates of sodium and potassium, or the hydroxides of sodium and potassium; or else alkaline magnesium or calcium compounds, such as magnesium hydroxide and magnesium carbonate, may be added to the suspension, which has the same effect of rendering the solution alkaline.

The invention as hereinabove set forth may be variously embodied within the scope of the claims hereinafter made.

What is claimed is:

1. The process of purifying gases which consists in: passing a substantially ammonia-freed gas into contact with an absorbent solution constituted of dissolved non-volatile alkali to absorb sulphur from the gas and containing in suspension an iron compound also having an affinity for sulphur, whereby a reaction occurs in which sulphur is transferred from the alkali to the iron, with formation of iron sulphide; then mechanically accelerating separation of the iron sulphide from the solution and subjecting the iron sulphide to aeration to remove the sulphur as free sulphur and restore the iron to its original state; separately aerating the alkali solution from which the iron sulphide has been removed; and then mixing the revivified iron compound with the alkali solution; substantially as specified.

2. The process of purifying gases which consists in: passing a substantially ammonia-freed gas into contact with an absorbent solution constituted of dissolved non-volatile alkali to absorb sulphur from the gas and containing in suspension an iron compound also having an affinity for sulphur, whereby a reaction occurs in which sulphur is transferred from the alkali to the iron with formation of iron sulphide; then mechanically accelerating separation of the iron sulphide from the solution and subjecting the iron sulphide to aeration to remove the sulphur as free sulphur and restore the iron to its original state; and then mixing the revivified iron compound with the alkali solution; substantially as specified.

3. The process of purifying gases which consists in: passing the gas into contact with an absorbent solution constituted of dissolved non-volatile alkali to absorb sulphur from the gas, and containing in suspension an iron compound also having an affinity for sulphur, whereby a reaction occurs in which sulphur is transferred from the alkali to the iron, with formation of iron sulphide; then mechanically accelerating separation of the iron sulphide from the solution and subjecting the iron sulphide to aeration to remove the sulphur as free sulphur and restore the iron to its original state; and then mixing the revivified iron compound with the alkali solution; substantially as specified.

4. The process of purifying gases which consists in: passing the gas into contact with an absorbent solution constituted of dissolved sodium carbonate to absorb sulphur from the gas; and containing in suspension an iron compound also having an affinity for sulphur, whereby a reaction occurs in which sulphur is transferred from the sodium carbonate to the iron, with formation of iron sulphide; then mechanically accelerating separation of the iron sulphide from the solution and subjecting the iron sulphide to aeration to remove the sulphur as free sulphur and restore the iron to its original state; and then mixing the revivified iron compound with the sodium carbonate solution; substantially as specified.

5. The process of purifying gases which consists in: passing the gas into contact with an absorbent solution constituted of not more than one per cent of dissolved non-volatile alkali to absorb sulphur from the gas, and containing in suspension an iron compound also having an affinity for sulphur, whereby a reaction occurs in which sulphur is transferred from the alkali to the iron, with formation of iron sulphide; then mechanically accelerating separation of the iron sulphide from the solution and subjecting the iron sulphide to aeration to remove the sulphur and restore the iron to its original state; and then mixing the revivified iron compound with the alkali solution; substantially as specified.

6. The process of purifying gases which consists in: passing the gas into contact with an absorbent solution constituted of not more than one percent of dissolved non-volatile alkali to absorb sulphur from the gas, and containing in suspension an iron oxide, whereby a reaction occurs in which sulphur is transferred from the alkali to the iron, with formation of iron sulphide; then mechanically accelerating separation of the iron sulphide from the solution and subjecting the iron sulphide to aeration to remove the sulphur as free sulphur and restore the iron to its original state; and then mixing the revivified iron compound with the alkali solution; substantially as specified.

7. The process of removing sulphur compounds from gases which consists in: passing a gas containing sulphur into contact with a sulphur-free non-volatile alkali solution containing a solid in suspension, the solution having an initial affinity for the sulphur of the gas and the solid in suspension having an affinity for the sulphur absorbed by the liquid, whereby the liquid acts as a carrier of the sulphur from the gas to the solid in suspension; then separating the solid matter containing sulphur from the bulk of the liquid and separately regenerating such solid matter with liberation of free sulphur therefrom; and mixing the regenerated solid matter with the liquid for further absorption of sulphur from gases; substantially as specified.

8. A process of removing hydrogen sulphide and other acidic gaseous constituents from gases which consists in treating the gas by contact with a liquid containing in suspension a solid reactive while in said liquid to hydrogen sulphide whereby the latter is absorbed by the suspension, mechanically accelerating separation from the spent liquid of a substantial proportion of the sulphided solid in the form of a sludge, subjecting the sludge to oxidation, whereby the solid reactive to hydrogen sulphide is reconstituted and sulphur is liberated as free sulphur, and mixing the oxidized sludge with the separated liquid.

9. A process as claimed in claim 8 in which the liquid contains an alkali in solution, and in which the solid reactive to the hydrogen sulphide is an iron compound, whereby a reaction occurs in which the alkali acts as a vehicle to transfer sulphur from the hydrogen sulphide of the gas to the iron compound, with formation of iron sulphide.

10. A process as claimed in claim 8 in which the absorbent liquid contains an alkali, and an iron compound in suspension and in which the resultant iron sulphide sludge separated from the liquid is subjected to aeration to remove the sulphur and restore the iron compound to its original state.

11. A process as claimed in claim 8 in which the liquid contains sodium carbonate in solution, and in which the solid reactive to the hydrogen sulphide is an iron compound.

12. A process as claimed in claim 8 in which the absorbent liquid employed contains about one per cent of dissolved alkali, and about three per cent of iron oxide in suspension.

13. A process as claimed in claim 8 in which an alkaline absorbent liquid and the solid in suspension are aerated separately and then mixed to reconstitute the liquid.

14. A process as claimed in claim 8 in which an alkaline absorbent liquid and the solid in suspension are aerated separately and then mixed to reconstitute the liquid, which reconstituted liquid is recirculated to the gas treating stage.

15. A process as claimed in claim 8 in which portions of the oxidized sludge are withdrawn, and sulphur separated therefrom, the residual oxide being returned to the liquid.

16. A process for regenerating a spent liquid from gas purification operations which comprises iron sulphide suspended in an alkaline solution, which consists in mechanically accelerating separation of the iron sulphide as a concentrated sludge, subjecting the sludge to oxidation with liberation of sulphur as free sulphur, and mixing the oxidized sludge with the liquid from which the sludge was separated.

17. Apparatus for the purification of gases comprising an absorber, a sludge separator tank adapted to receive the spent liquid discharged from the absorber and adapted to separate sludge from spent liquid, a tank adapted to receive the clear liquid discharged from the sludge separator, sludge oxidation means adapted to receive and to oxidize sludge from said sludge separator tank, means for conveying oxidized sludge to the clear liquid receiving tank, and means for returning the mixed sludge and clear liquid to the absorber.

18. Apparatus as claimed in claim 17 in which the tank receiving the clear liquid and oxidized sludge is equipped with an air agitator.

19. Apparatus as claimed in claim 17 in which the tank receiving the clear liquid and oxidized sludge is equipped with an air agitator and a further tank, equipped with an air agitator, is provided between the absorber and the separator.

In testimony whereof I have hereunto set my hand.

FREDERICK W. SPERR, Jr.